United States Patent [19]

Horne et al.

[11] 3,727,766
[45] Apr. 17, 1973

[54] VACUUM SKIMMING APPARATUS FOR REMOVING LIQUID CONTAMINANTS FLOATING IN CONFINED BODIES OF WATER

[76] Inventors: Don M. Horne, 5300 Swarthmore St., La Mesa, Calif. 93041; William H. Heyser, 1408 Sunnyland Avenue, El Cajon, Calif. 92021; Herman M. Neely, 934 W. Michelle St., West Covina, Calif. 91790

[22] Filed: May 18, 1971

[21] Appl. No.: 144,500

[52] U.S. Cl. ............................210/242, 210/DIG. 21
[51] Int. Cl. .............................................E02b 15/04
[58] Field of Search ................210/242, 83, DIG. 21, 210/169

[56] References Cited

UNITED STATES PATENTS

| | | | |
|---|---|---|---|
| 3,578,171 | 5/1971 | Usher | 210/DIG. 21 |
| 3,534,858 | 10/1970 | Harrington | 210/DIG. 21 |
| 3,552,568 | 1/1971 | Wade | 210/169 |
| 3,304,564 | 2/1967 | Green et al. | 210/169 |
| 3,530,511 | 9/1970 | Berg et al. | 210/169 |
| 3,666,098 | 5/1972 | Garland et al. | 210/242 |

FOREIGN PATENTS OR APPLICATIONS 1,528,777   6/1968   France..........................210/DIG. 21

Primary Examiner—Samih N. Zaharna
Assistant Examiner—T. A. Granger
Attorney—R. S. Sciascia, George J. Rubens and J. W. McLaren

[57] ABSTRACT

A boat-mounted vacuum system for removing floating liquid contaminants, such as oil spills, particularly from confined bodies of waters such as harbors, bays, and the like. The system employs one or more water jet eductors for creating a vacuum in a vacuum tank located between the suction heads and the pump supplying high pressure water to the eductors so that the pump does not lose its prime when the suction heads are lifted off the water surface from which it is collecting the contaminants.

1 Claim, 3 Drawing Figures

VACUUM SKIMMING APPARATUS FOR REMOVING LIQUID CONTAMINANTS FLOATING IN CONFINED BODIES OF WATER

STATEMENT OF GOVERNMENT INTEREST

The invention described herein may be manufactured and used by or for the Government of the United States of America for governmental purposes without the payment of any royalties thereon or therefor.

BACKGROUND

This invention relates to skimmer-type vacuum systems for removing liquid contaminants from the surface of a body of water, designed primarily for confined bodies of water such as harbors and bays, but it is understood that the invention can be used for any purposes for which it is found applicable.

Numerous types of devices and techniques have been devised on boats to remove liquid contaminants, such as oil spills from a body of water. In open unrestricted waters having varying degrees of sea state conditions, these devices for the most part collect the surface contaminants by pushing a ramp or movable collecting member, i.e., belt or disc, into the spill which necessitates that the boat be underway during the collecting operation. For the most part, such devices have been quite successful, however, they are not suitable for collecting oil spills in confined areas such as in harbors around docks, ships, etc. since the space for maneuvering the boat is usually quite limited.

In confined areas, the contaminant must be collected with the boat having little or no movement in the water, an accordingly, various types of vacuum systems have been suggested to meet this requirement. Some devices rely on a gravity feed by placing the collection tank below the surface of the water and relying on a relatively small vacuum to induce the collecting flow. Such systems are a slow operation and thus limited in the volume of contaminants recovered.

Other systems use a larger vacuum source but connect vane or piston-type pumps directly to the contaminant suction hoses and heads. Whenever these vacuum heads are removed from the surface of the contaminant the vacuum head is lost and the pump must be reprimed. In addition, the life of mechanical pumps in such a corrosive salt-water environment is limited. By using a mechanical pump for creating the vacuum in the vacuum tank any overflow of the vacuum tank of the contaminant-water mix flows directly into and floods the pump causing such pumps to stop and lose the prime, in addition to causing a messy clean-up condition. Thus the operation of most of such vacuum systems are intermittent and not continuous.

Another important disadvantage of mechanical-type pumps is that they exhaust a volatile gas from the vacuum tank directly into the air around the boat, and in the vicinity of the various petroleum tanks located directly in the area of the spill. Thus it is obvious that accidental fire ignition from a spark or match could cause a disastrous fire jeopardizing the boat and its personnel as well as adjacent structures, i.e., wharves and the like.

SUMMARY OF THE INVENTION

The apparatus for skimming continuously a liquid from a surface of water, such as spilled oil contaminant includes a boat or barge containing at least a vacuum tank and preferably a holding tank. The vacuum tank is vacuumized to 15 to 20 inches Hg by one or more water jet eductors which are operated by a high pressure pump drawing clean water from beneath the boat. One or more sets or vacuum hoses and suction heads are connected to the vacuum tank whereby the boat operators can manipulate the heads to skim the contaminant from the surface. An important feature of using an eductor, apart from its simplicity, durability, and longevity, is that the eductor overboard exhaust is normally connected to the vacuum tank so as to accommodate any overflow of the contaminant in the vacuum tank. In a conventional system an overflow condition in the vacuum tank would back-up and disable a mechanical-type pump. A second pump and valve means are provided selectively to evacuate the vacuum tank and/or the holding tank directly to an overboard depository. Suitable piping and valves are connected to the pump to provide high pressure water for backwashing the hose and suction head for cleansing purposes.

STATEMENT OF OBJECTS

An important object of this invention is to provide apparatus for skimming a floating liquid contaminant which is simple, dependable, rugged, and continuous in operation.

Still another important object is to provide a skimming apparatus which employs an eductor between its associated water pump and a vacuum tank for creating a vacuum in the latter, and which also provides convenient overboard discharge should the vacuum tank accidentally overflow. A corollary object is to provide a means for exhausting overboard the volatile vapors from the vacuum tank directly into the body of water to minimize the danger of explosion in the surrounding air environment or in the pump means.

Another object is to provide a valve means for utilizing the pressurized water from the water pump to backflush the suction hoses and heads.

Other objects, advantages and novel features of the invention will become apparent from the following detailed description of the invention when considered in conjunction with the accompanying drawings.

DESCRIPTION OF THE PREFERRED EMBODIMENT

Figure 1:
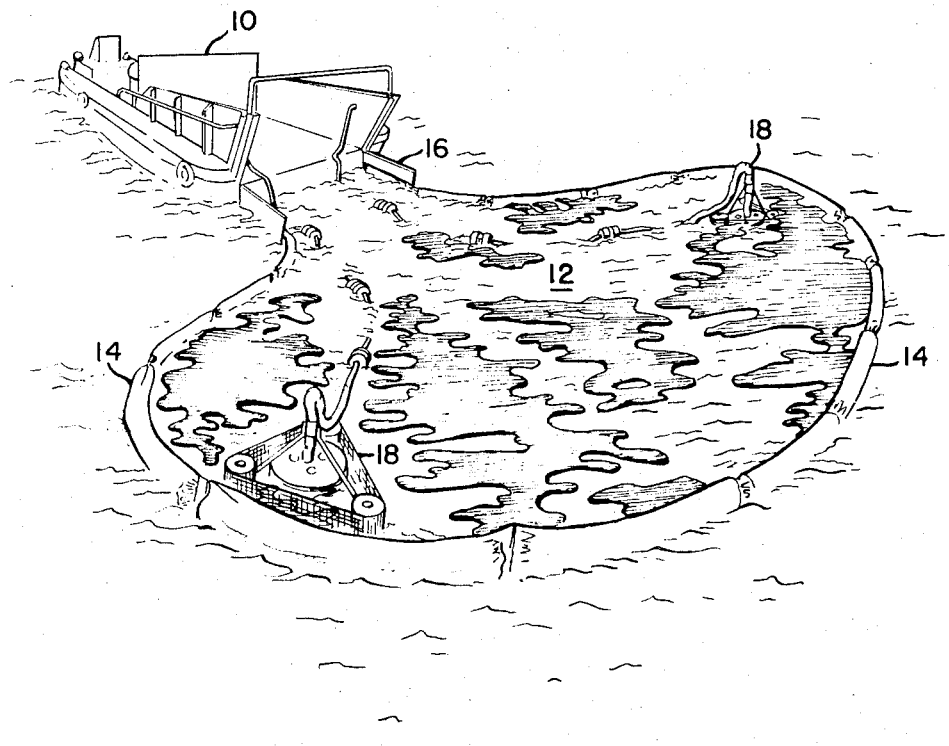
FIG. 1 is a diagrammatic perspective view of the novel skimming apparatus in an operational mode collecting an oil spill from a body of water.

Referring to the drawing where like reference numerals refer to similar parts throughout the figures there is shown in FIG. 1 a diagrammatic view of the novel skimming system including a barge or boat 10, a Navy landing-type LCM being illustrated, having been maneuvered to a position adjacent a contaminant slick 12, such as one usually caused by petroleum spill. Where necessary, the oil slick may be confined by a floatable boom 14, of conventional design, deployable from boat 10. The boom is capable of being gradually hauled into the boat to gradually concentrate the slick toward boat ramp 16 which is shown in a lowered position. One or more floatable vacuum heads 18 and vacuum flexible hoses 20 are connected to the novel vacuum system presently to be described. Inlet bow valves 21 are connected in vacuum hoses 20. Various types of floatable vacuum heads may be employed, the details of which do not form a part of this invention.

Figure 2:
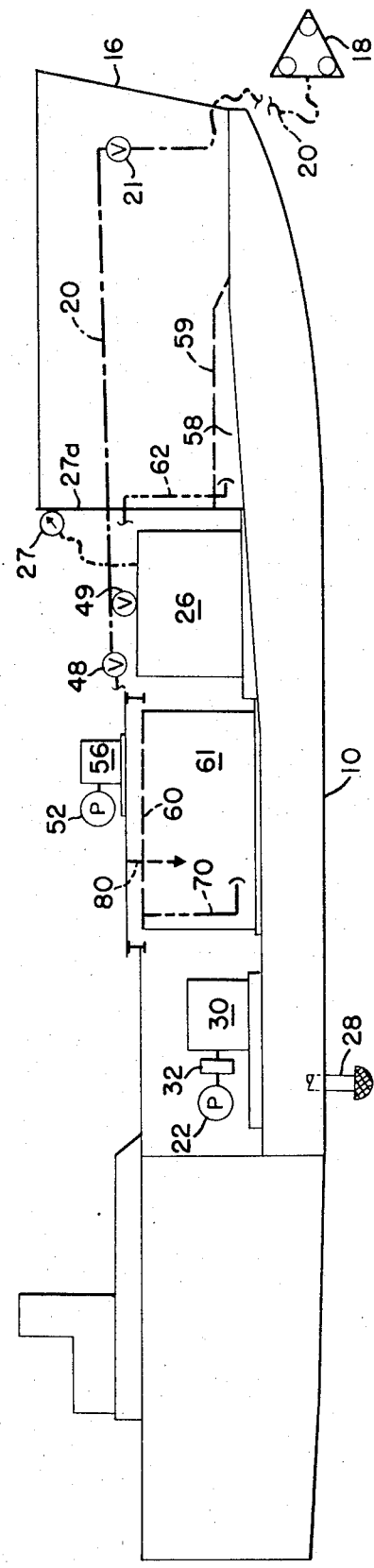
FIG. 2 is a profile view of the boat housing the skimming apparatus showing the location of the major components with the sump ramp closed.
Figure 3:
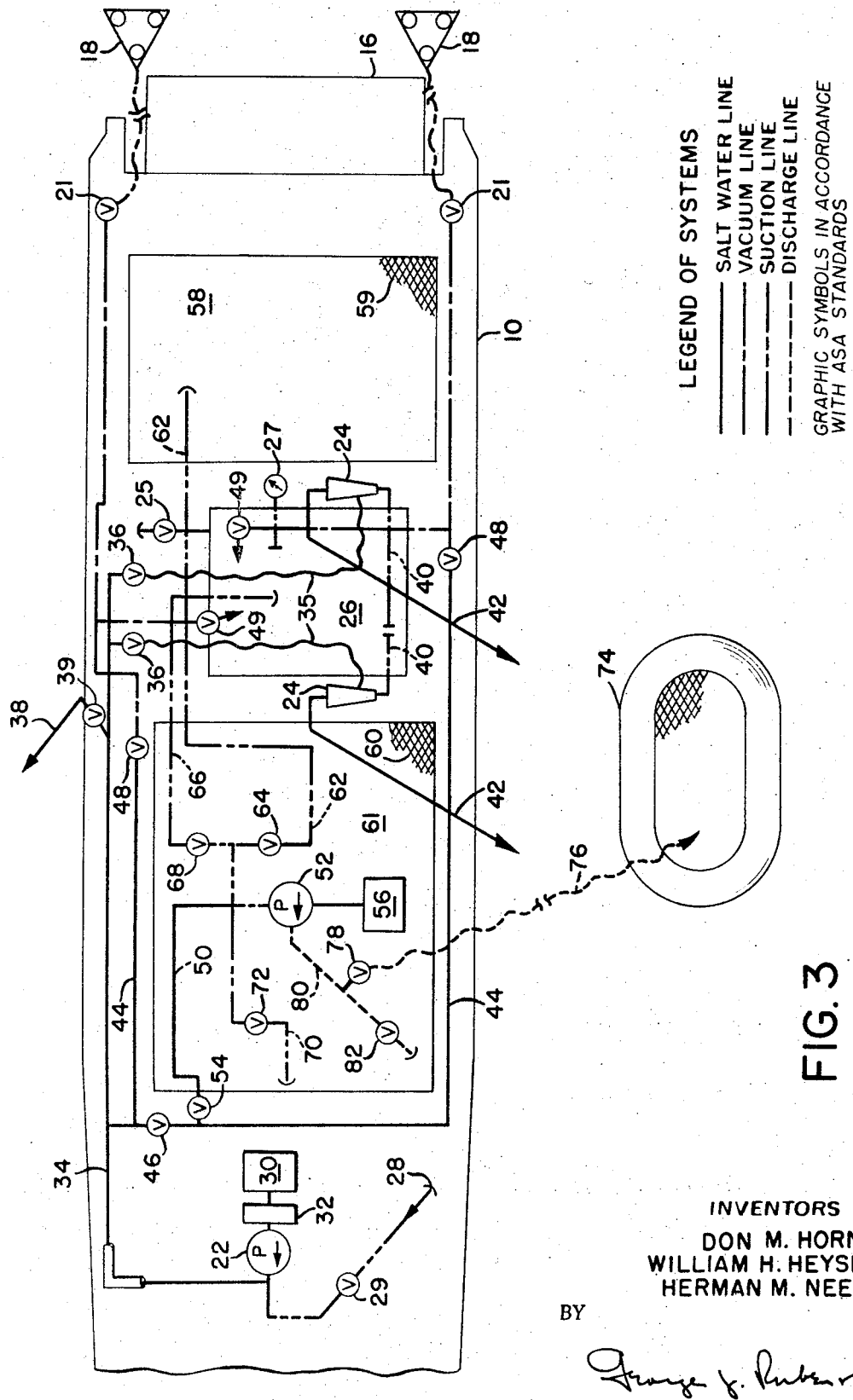
FIG. 3 is a plan view of the novel skimming apparatus of FIG. 2 showing the novel piping and valve arrangement between the components of the skimming system with the sump ramp open.

The location of the components of the novel vacuum pick up system are shown in FIGS. 2 and 3 and comprises in essence four associated piping systems including a high pressure water system, a contaminant vacuum system, a collected contaminant suction system and a contaminant discharge system. These systems will be represented on the drawing with appropriate legends in accordance with the legend associated with FIG. 3. The water pressure system may be referred to as a salt water system, since the boat will be usually operating in salt water, and is represented in the drawings by a heavy black line. The salt water system includes a pump 22 for providing a source of high pressure water to one or more eductors 24 mounted on top of a vacuum tank 26 for creating and maintaining a vacuum therein. Two eductors are illustrated, the number of which may vary with each installation. The amount of vacuum can be indicated by a gauge 27 mounted on bulkhead 27a, the gauge being connected to the top of vacuum tank 26. A bleed valve 25 is also located on top of vacuum tank 26.

In one actual Navy installation employing the invention, pump 22 is a 500 GPM, 100–125 psi pressure, centrifugal-type having a suction intake line 28 projecting below the boat into the salt water, line 28 having a cut-off valve 29. The pump is driven by a six-cylinder gas engine 30 preferably through a conventional clutch 32. Main salt water pressure line 34 from pump 22 is directed to each of the eductors 24 through intake lines 35, each having a cut-off valve 36. Main pressure line 34 between the eductors 24 and pump 22, is also provided an overboard discharge line 38 having a cut-off valve 39 which permits the eductors to be secured temporarily without securing the main pump 22 in the event no clutch 32 is provided, or the clutch is inoperable.

In the installation described, eductors 24 are "Perijets" made and commercially available from the Derbyshire Co. of Philadelphia. For a vacuum tank having a 500-gallon capacity, two eductors are preferred. The eductors are capable of creating a vacuum of 25 to 30 inches Hg in tank 26 via vacuum lines 40, although a lower operating vacuum of 15 to 20 inches Hg is preferred. Each eductor has an overboard discharge line 42 extending below the salt water surface.

The use of eductors 24 in association with vacuum tank 26 provide many unique advantages. Should vacuum tank 26 overflow for any reason, the collected oil spill and any volatile gases therefrom is vented through discharge lines 42 to mix with and be neutralized by the salt water which minimizes the dangers of explosion as well as being a visible indicator to personnel of the occurrence of the overflow condition. With these conditions, operating personnel may want to secure the operation to avoid undesirable emulsification of the oil slick which will make the oil-water separation more difficult. The use of prior art mechanical pumps present a substantial hazard when used under these conditions since any contaminant overflow may inactivate the pump and cause a loss of prime. However, even more critical, venting of the combustible vapors from vacuum 26 by such mechanical pumps into the surrounding air or into the pump cylinder creates a critical explosion hazard since the boat contains several tanks filled with the oil contaminant as well as fuel and it is floating in the midst of the oil spill. In addition eductors 24 are more durable and being simple require less repairs than conventional mechanical-type vacuum pumps in the highly corrosive salt water environment.

A subsidiary backflushing system for vacuum pick up heads 18 and hoses is provided in the salt water system, and comprises a pair of parallel lines 44 connected to salt water main 34 through a main valve 46 and connected at the other ends to vacuum hoses 20 via valves 48. Opening of valves 46 and 48 enables hoses 20 and heads 18 to be cleaned periodically by the high pressure salt water. Shut off valves 49 are provided in hoses 20 adjacent vacuum tank 26 to prevent backflushing the tank if not desired. A priming line 50 to a pump 52 and controlled by a cut-off valve 54 is connected in backflushing lines 44 and may be utilized independently of the backflushing operation by the judicious manipulation of the pertinent valves.

A contaminant vacuum line system is represented in the drawings by one of several broken lines (see legend in FIG. 3) and includes the vacuum heads 18 and the flexible vacuum hoses 21 which are connected to the top of vacuum tank via valves 21 and 49 into which is discharged the collected contaminant mixed with salt water.

In addition to the salt water pressure and contaminant vacuum line systems heretofore described, there also is provided a contaminant suction system also represented in the drawings by another broken line (see legend) which centers around positive displacement marine suction pump 52 driven by a 6.5 HP engine 56. Suction pump 52, by a network of piping presently described, serves to shift selectively the collected oil-water mix from a forward boom stowage compartment 58 covered by steel grating 59 (FIG. 2), from vacuum tank 26, and from a large holding tank 61 located amidship having a grill top 60. The function of holding tank 61 as its name implies provides a large stowage tank (being 1,500 gallons in the preferred embodiment) to receive the collected oil from vacuum tank 26 in the event there is no other depository means anchored adjacent the boat. The drain from boom compartment 58 which accumulates the oil-water drippings from the stowed boom, suction lines and heads, is through pipe 62 and associated valve 64. The drain suction from the bottom of vacuum tank 26 is through pipe 66 and associated valve 68. The drain suction from the bottom of holding tank 61 is through pipe 70 and valve 72.

The oil-water suction from the two contaminant tanks 26 and 61 and compartment 60 is distributed by pump 52 in one of two discharge paths depending on the manipulation of the various valves, which paths define the fourth system employed in the invention and having another broken line symbol (see legend). If an oil disposal raft 74 is temporarily anchored adjacent boat 10, pump 52 dumps the oil-water mix from one or more of the tanks via pump 76 and valve 78. Raft 74 is commonly referred to as a "do-nut" since it is generally circular with a ring-shaped float on top and closed vertical sides with no bottom. The size normally used with the invention installation has a 32,000 gallon capacity. Raft 74 provides the intermediary means to separate and to transport the oil-water mix. The contaminant oil being lighter rises to the top of raft 74 while the water being heavier settles and is gradually forced out through the open bottom. When the raft 74 is substantially filled with oil (i.e., one-half being a safe capacity) it is towed away for "pumping out" and an empty do-nut raft is brought alongside. During this transfer period, or if the spill is smaller than the capacity of holding tank 61 obviating the need for raft 74, the oil-water mix from vacuum tank 26 and boom compartment 60 may be discharged by pump 52 into holding tank 61 via pipe 80 and valve 82.

OPERATION

The novel vacuum pick-up apparatus has been designed to be simple and operable by a minimum number of relatively unskilled personnel. Boat 10 is first maneuvered to the area of the spill and, where necessary to confine the spill, boom 14 is deployed from the boat. Sump ramp 16 is lowered to provide for a convenient collection sump for the oil confined by boom 14. Before starting main salt-water pump 22, overboard discharge valve 39 and salt water inlet valve 29 are opened, and vacuum hose valves 21 and 49 are closed.

Main pump 22 is started and operating pressure is developed to between 100-125 psi. Valves 36 to eductors 24 are then opened after which overboard discharge valve 39 is closed to discontinue cycling the high pressure salt water overboard and commence drawing the vacuum in tank 26. Although a vacuum of 25 to 30 inches Hg can be developed by the described equipment with both suction heads 18 in operation, such an extreme vacuum is unnecessary and undesirable. Satisfactory operation can be achieved by adjusting and maintaining the vacuum to between 15-20 inches Hg by means of bleed valve 25 and/or by regulating the salt water supply to the eductors by means of valves 36. It should be noted as a warning that if the salt water pressure in lines 35 to eductors 24 drops below 80 psi, eductors 24, will inherently backwash and fill vacuum tank 26 to dissipate the vacuum and the overflow will be discharged through lines 42. However, in comparison with prior art systems employing mechanical-type pumps in lieu of eductors, that the main salt water pump 22 is unaffected by such an overflow condition and in addition any volatile gases in vacuum tank 26 are discharged with the overflow or with the normal eductor discharge flow in lines 42 directly into the body of water.

Upon reaching the desired operating vacuum in tank 26, one or both of the two suction heads 18 are dropped into the spill and the bow valves 21 to the heads 18 are opened. Then vacuum line valves 49 are opened one at a time while watching the vacuum gauge 27 to observe any drop in operating vacuum pressure which would indicate a leak in the vacuum system. With the system thus described vacuum heads 18 should be sucking the oil-water contaminant mix at a rate of approximately 600 gal/hour. If it is desired to operate with only one suction head, valve 21 to the inactivated head is secured.

Contaminant suction pump 52 is then started after opening valves 72 and 82, which will enable the oil contaminant to be recycled within holding tank 61. When vacuum tank 26 becomes about half full of the oil-water mix, valve 72 is closed, and valve 68 is opened to take a suction on vacuum tank 26 for draining into holding tank 61. If "do-nut" barge 74 is alongside boat 10, valve 82 can be closed and valve 72 and/or 78 opened so that pump 52 will discharge vacuum tank 26 and holding tank 61 into barge 74. Opening valve 64 will likewise drain boom compartment 58.

SUMMARY

The novel vacuum pick up apparatus heretofore described simply and expeditiously removes oil spills and the like from relatively quiet waters, such as in bays and harbors, where the boat need not be underway during operation. Employment of eductors for creating a vacuum provides several unique advantages over mechanical-type pump apart from the obvious advantage of being more suitable for a highly corrosive environment. Any overflow condition of the vacuum tank will be discharged directly through the eductors into the overboard discharge without flooding its pump and causing a loss of prime. Probably more important from a safety consideration, is the safe disposition of any volatile gases from petroleum-type contaminants that may exist in the vacuum and holding tanks via the overboard discharge through the eductors and contaminant pumps respectively, rather than discharge into the surrounding air where accidental ignition could cause a fire that would envelope the boat and adjacent wharves. A similar explosion could arise by the trapped gases in the prior art pump cylinders.

Obviously many modifications and variations of the present invention are possible in the light of the above teachings. It is therefore to be understood that within the scope of the appended claims the invention may be practiced otherwise than as specifically described.

What is claimed is:

1. In a system for collecting oil from a confined area on the surface of a body of water said system comprising a vacuum tank, means for producing a vacuum in said tank, a flexible conduit with a first end connected to said tank and a second end adapted to collect oil from the surface of said body of water, the improvement comprising:
   a water pump with an inlet and outlet thereto;
   first conduit means with one end connected to said inlet of said water pump and a second end located beneath the surface of said body of water at a location removed from said confined area;
   water operated eductor means operatively connected to the vacuum tank of said system for producing a continuous vacuum therein, means for transferring the oil collected in said vacuum tank to a depository, said transfer means being separate from and operable independently of said eductor;

conduit means connected between said outlet of said water pump and an inlet to said water operated eductor means, second conduit means with a first end connected to an outlet of said water operated eductor means and a second discharge end located spaced apart from said eductor means and leading to said body of water whereby water utilized in operating said eductor may be discharged into said body of water at a location removed from oil floating on the surface of said body of water.

* * * * *